(12) United States Patent
Grossman et al.

(10) Patent No.: US 7,370,290 B2
(45) Date of Patent: May 6, 2008

(54) CONTACT CARD

(75) Inventors: Joel K. Grossman, Seattle, WA (US);
Cornelis K. van Dok, Bellevue, WA (US); Jonathan D. Perlow, Seattle, WA (US); Vivien Park, Seattle, WA (US); Sean O. Blagsvedt, Seattle, WA (US); Gilad Israeli, Thornhill (CA); Michelle D. McKelvey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 10/324,246

(22) Filed: Dec. 19, 2002

(65) Prior Publication Data

US 2004/0122683 A1 Jun. 24, 2004

(51) Int. Cl.
*G06F 3/14* (2006.01)
*G06F 3/00* (2006.01)
*G06F 17/00* (2006.01)
(52) U.S. Cl. .................. 715/864; 715/744; 715/748
(58) Field of Classification Search ................. 707/10
See application file for complete search history.

(56) References Cited

U.S. PATENT DOCUMENTS

| | | | |
|---|---|---|---|
| 5,640,565 A * | 6/1997 | Dickinson ............... 707/103 R |
| 5,950,193 A | 9/1999 | Kulkarnia | |
| 6,157,954 A * | 12/2000 | Moon et al. ............... 709/228 |
| 6,269,369 B1 * | 7/2001 | Robertson ................. 707/10 |
| 6,532,459 B1 | 3/2003 | Berson ..................... 707/3 |
| 6,539,377 B1 | 3/2003 | Cullis ..................... 707/5 |
| 6,553,037 B1 | 4/2003 | Pivowar et al. ............. 370/463 |
| 6,557,004 B1 | 4/2003 | Ben-Schachar et al. | |
| 7,127,473 B2 | 10/2006 | Agassi et al. ............ 707/103 R |
| 7,185,290 B2 * | 2/2007 | Cadiz et al. ............... 715/838 |
| 2002/0065072 A1 | 5/2002 | Lindh ..................... 455/422 |
| 2003/0007464 A1 | 1/2003 | Balani .................... 370/310 |
| 2003/0069874 A1 * | 4/2003 | Hertzog et al. .............. 707/1 |
| 2003/0078993 A1 * | 4/2003 | Hull et al. ................ 709/219 |
| 2003/0217328 A1 | 11/2003 | Agassi et al. ............. 715/500 |
| 2004/0042599 A1 * | 3/2004 | Zaner et al. ........... 379/144.01 |
| 2004/0119761 A1 | 6/2004 | Grossman et al. ......... 345/854 |

(Continued)

OTHER PUBLICATIONS

U.S. Appl. No. 10/606,578, filed Jun. 26, 2003, Blagsvedt et al.

(Continued)

*Primary Examiner*—Weilun Lo
*Assistant Examiner*—Jordany Nunez
(74) *Attorney, Agent, or Firm*—Merchant & Gould P.C.; Ryan T. Grace

(57) ABSTRACT

An interface for enabling a user to quickly access contact information and contact-centric tasks is displayed when an appropriate request for a contact card associated with a contact is received. The contact card displays contact information corresponding with the contact as well as contact-centric tasks that may be engaged in between the client computing system and the computing system of the contact. The list of contact-centric tasks is organized according to predetermined criteria, such as whether the contact-centric task is associated with an application that has provided contact information to the client computing system and whether the contact is a member of a group utilizing a contact-centric task. The contact card may also include an object comprising a type-in line for launching communication with the contact.

39 Claims, 6 Drawing Sheets

U.S. PATENT DOCUMENTS

2005/0193335 A1    9/2005   Dorai et al. ................ 715/530
2007/0011148 A1    1/2007   Burkey et al. ................ 707/3

OTHER PUBLICATIONS

Anderson, T., *Change Your Outlook*, Developer Network Journal, No. 25, p. 50-1, Jul.-Aug. 2001.

Taylor, T.C., *Databases Save Time And Customers*, Sales & Marketing Management, vol. 142, No. 4, p. 105-7, Mar. 1990.

Kubota, K.; Masuno, H., *Multi-Media Software PI*, NEC Technical Journal, vol. 41, No. 13, p. 72-6, Nov. 1988.

Pettigrew, T., *ACT!- Automated Contact Tracking*, CA Magazine, vol. 95, No. 1022, p. 48-9, Sep. 1991.

Simaioforidis, A.; Karlgren, J.; Ereback, A., *Research and Advanced Technology for Digital Libraries, Second European Conference, ECDL '98. Proceedings*, p. 673-4, Sep. 21-23, 1998.

Heller, S.R., *Symantec. ACT! 4.0 for Windows*, Journal of Chemical Information and Computer Sciences, vol. 38, No. 4, p. 772, Jul.-Aug. 1998.

* cited by examiner

CONTACT CARD

BACKGROUND OF THE INVENTION

1. The Field of the Invention

The present invention relates to user interface menus for electronic devices and, more particularly, to methods, systems, and computer program products for obtaining and displaying contact information.

2. Background and Relevant Art

The term "contact," as described herein, generally refers to any person, group, organization, business, household, or other type of identifiable entity. The term "contact information," as defined herein, generally refers to any information that corresponds to a contact and that may be considered relevant for contacting, accessing, corresponding or communicating with the contact.

In the context of the present application, contact information is used by applications to perform a desired function, such as, for example, sending an email, initiating a telephone call, accessing a website, initiating a gaming session, performing a financial transaction, scheduling a meeting, and so forth. Non-limiting examples of contact information include names, aliases, telephone numbers, email addresses, home addresses, and web addresses. Contact information can also refer to other types of information such as the status of a contact. For example, information indicating a contact is currently online, or on a telephone line may also be broadly considered as contact information.

Many existing computer applications are configured to store and display application specific contact information. For example, email applications typically include directories for storing and displaying the email addresses of contacts that can be emailed. Money management applications typically include directories for storing contact information about related financial contacts, such as, for example, banks, accounting service organizations, financial planning organizations, and so forth. Other examples of applications that utilize contact information include time management applications, instant messaging applications, network gaming applications, business directory applications, telephony applications, and so forth.

Certain hardware devices that are not considered traditional computers are also configured to store and use contact information. For example, many telephones, facsimile devices, and photocopying devices store contact information that may be used to perform a desired function such as initiating a telephone call, a facsimile transmission, or a telecopy transmission.

One problem encountered with obtaining contact information, however, is that the large variety of specialized and disparate contact management systems and contact directories can make it difficult for a user to quickly access all of the available contact information for the various applications and at the same time. This can be a problem, for example, when a user desires to identify all available means for making contact with a given entity because it may require the user to separately access various directories from many different contact management systems in order to obtain the desired contact information. For example, it may be necessary to access a telephone directory to obtain the home or cell telephone number for the contact, an email directory to obtain a primary email address for the contact, a business directory to obtain the business telephone number, and business email address of the entity, and so forth.

This disparity between contact management systems and directories can also be a problem for obtaining different types of contact information about different contacts. For example, it may be desirable to view the email address of a first contact, the business telephone number of a second contact, and the cell telephone number of a third contact. If the desired contact data for the different entities is located in different application directories, then each application will have to be accessed to obtain the desired information. This can particularly be a problem when a user has forgotten in which of the application directories the desired contact information is stored.

To overcome some of these problems, some contact management systems are configured to store more contact information then is required for the corresponding application. For example, an email directory may be configured to store the addresses, phone numbers and other information about the various contacts stored therein. However, it is somewhat undesirable to duplicatively enter every piece of contact information about every contact into every utilized contact management system. This redundant storage would also represent undesirable and unnecessary expenditure of resources.

Yet another problem experienced by some contact management systems is that it is difficult or impossible for a user to access contact information from a directory or backing store that is not associated with the application being used by the user. For example, a user cannot easily access telephony information stored in a telephony directory from an email application.

Another problem with existing applications and user interfaces is that they are limited in allowing contact-centric tasks to be performed between the user and the contacts. For example, an existing game may include the name of an opponent playing the game, but the ability to send the contact an instant message or email is not available through the gaming interface.

BRIEF SUMMARY OF THE INVENTION

The present invention is directed to an improved user interface for use with other interfaces and applications for displaying contact information and contact-centric tasks.

According to one aspect of the invention, a contact card interface displays contact information that is associated with a contact. The contact information may include, for example, a name, telephone number, email address, network status, and an image associated with the contact. The contact card interface may be hosted by any number of other interfaces and applications to provide the desired contact information without interfering adversely with the hosting application.

The contact card also displays contact-centric tasks that can be performed between the computing system displaying the contact card and the computing system of the contact. When a contact-centric task is selected by a user, the application associated with the contact-centric task is launched. The contact-centric tasks may be filtered based upon any predetermined criteria. According to one embodiment, the filtered list of contact-centric tasks are filtered based upon whether or not the application associated with each contact-centric task has provided contact information about the contact to the computing system. The filtered list may also be filtered based upon whether or not the contact is a member of a group associated with the contact, or upon a predetermined state or status of the contact and the user (e.g. are they both online?)

A user can modify the manner and order in which the contact-centric tasks are displayed. According to one embodiment, the contact-centric tasks are displayed in a pinned task section or a most-frequently used task section, depending upon predetermined criteria and user designation. The contact card interface also includes overflow menus for accessing contact information and contact-centric tasks that are not originally displayed by the contact card.

The manner in which the contact information and contact-centric tasks are displayed help to overcome some of the problems associated with other contact management systems and interfaces.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods, systems, and corresponding computer program products for displaying contact information and contact-centric tasks. The term "contact information," as defined herein, generally includes information that is associated with a contact and that may be considered relevant for contacting, accessing, corresponding or communicating with the contact. The term "contact-centric tasks," as defined herein, generally refers to activities or computing applications that can be engaged in between the computing client computing system and the contact. The embodiments of the present invention may comprise or be performed with a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
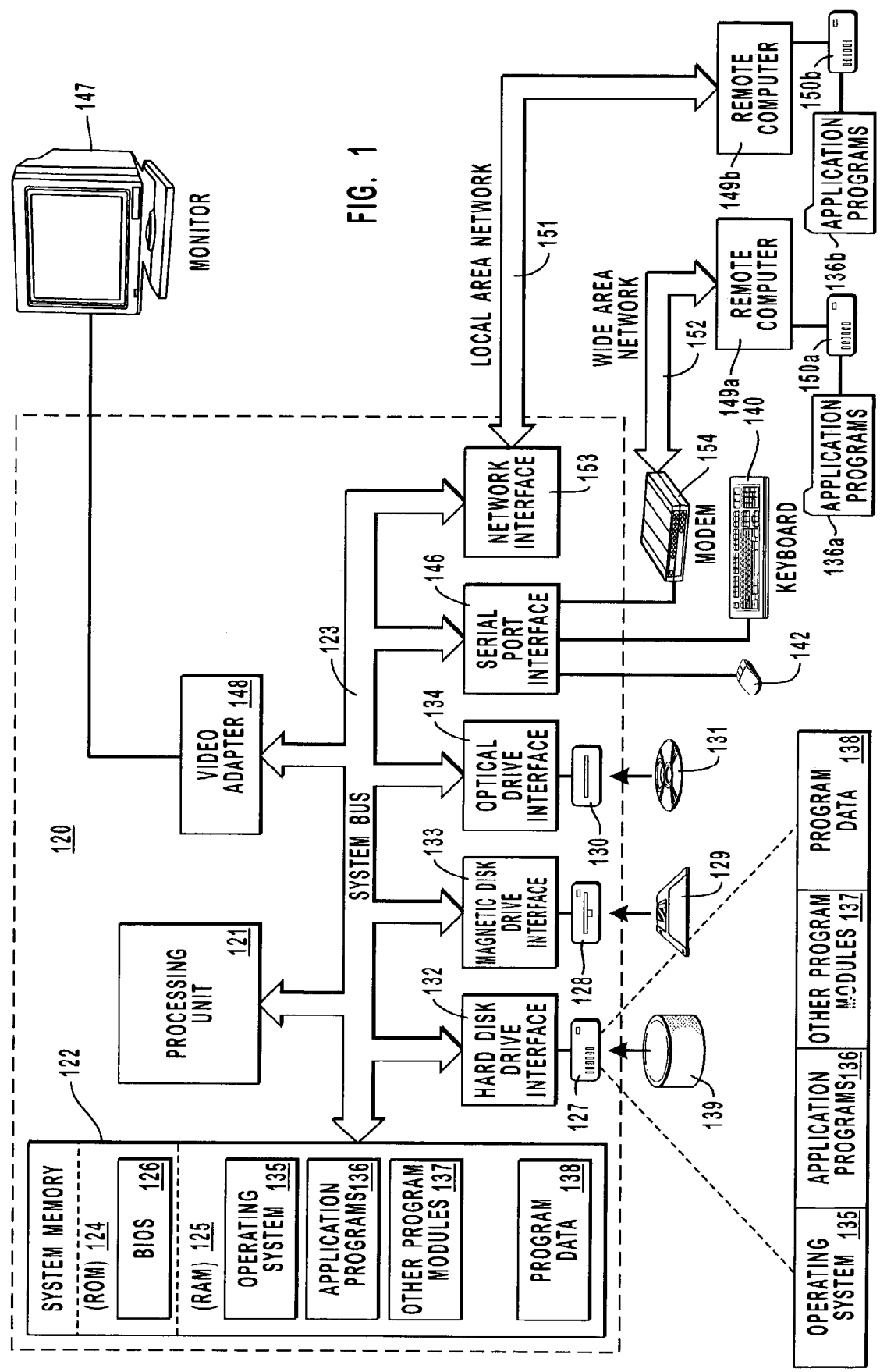
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129. and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 20 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
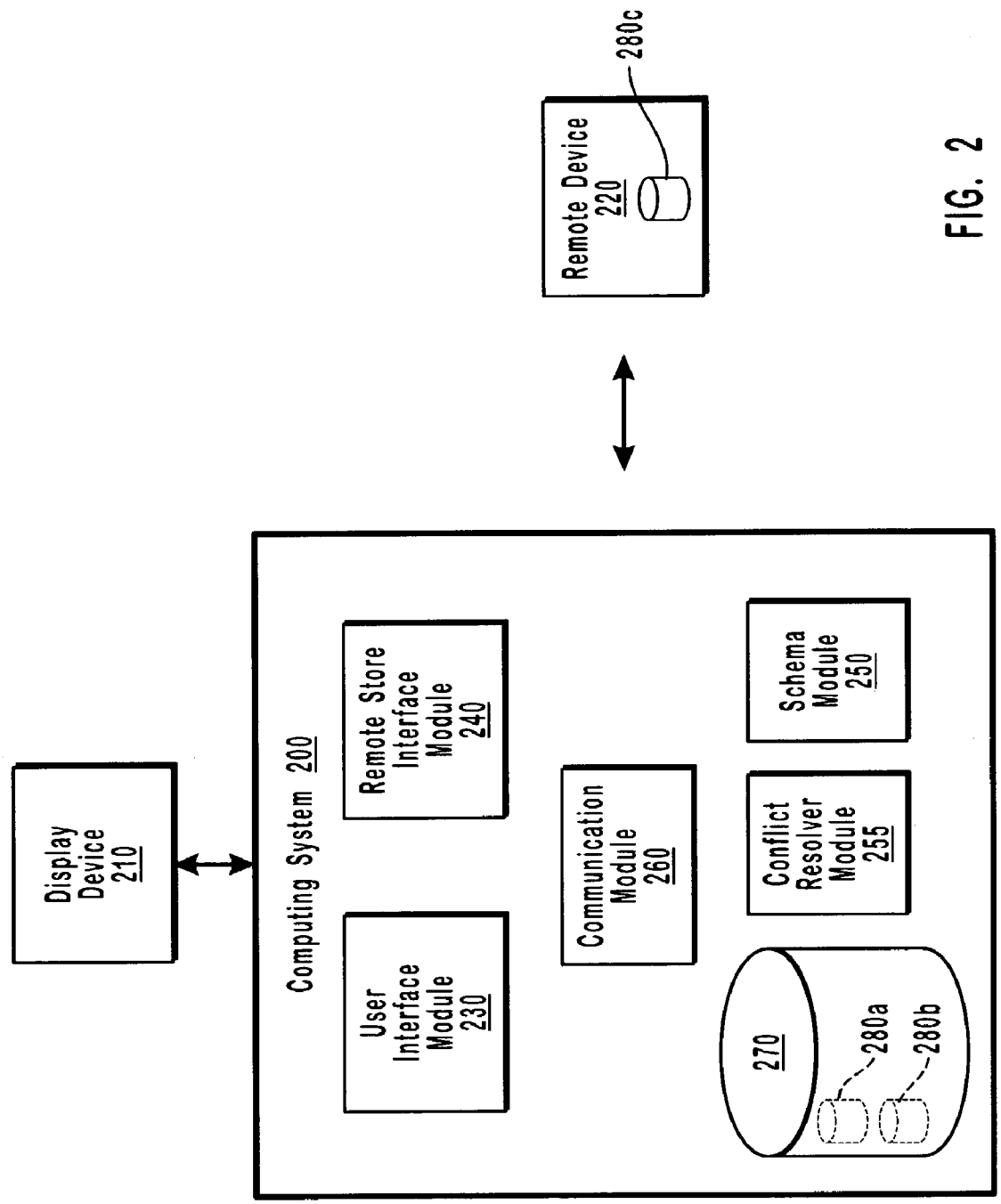
FIG. 2 illustrates one embodiment of a functional block diagram of various components of the invention.

FIG. 2 illustrates a functional block diagram of several components of the invention. As shown, a computing system 200 is connected with a display device 210 and a remote device 220. The connection link between each of these components may be a physical connection or a wireless connection. It will be appreciated that the display device 210 may be located remotely from the computing system 200 or integrally connected with the computing system 200. The display device 210 may comprise any screen, monitor, or other device that is configured to display images.

During use the computing system utilizes a user interface to display desired contact information at the display device. The functionality of the user interface to display desired contact information is enabled by various computer modules, such as user interface module 230, remote store interface module 240, schema module 250, conflict resolver module 255, and communication module 260, each of which will now be described.

The user interface module 230 includes sufficient computer executable instructions for operably displaying a user interface at the display device and for responding to user input entered at the user interface. The user interface module 230 can also determine what contact-centric tasks should be displayed to the user. The tasks that may be displayed include tasks that are included as part of the operating system and interface, as well as tasks that have been added by third parties. This module may include computer-executable instructions for determining which tasks are appropriate to show in a given situation. This determination can be based on user input and/or default settings.

The remote store interface module 240 includes sufficient computer executable instructions for searching and processing contact information stored at remote devices, such as remote device 220. Remote device 220 may be a remote computer, server containing contact information.

The schema module 250 contains sufficient computer executable instructions for mapping contact information into categories and classifications that can be recognized by the user interface for display on the display device 210. The schema module 250 is useful for enabling contact information from remote stores to be organized according to a single unifying schema. The schema module 250 may also be used to map and identify contact information stored in local stores, such as storage media 270.

The conflict resolver module 255 includes sufficient computer executable instructions for comparing disparate contact information and for determining which of the contact information is most accurate and appropriate for a given application based on instructions received from the API of a given application. Conflict resolver module 255 also monitors and determines what contact information is most likely to be expected or used by a user, such as, for example, based on the past use of the contact information. Accordingly, the conflict resolver module 255 may utilize space on a storage medium, such as storage media 270 for tracking use of contact information.

The communication module 260 includes sufficient computer executable instructions for enabling communication between the various modules, as well as the display device 210, the remote device 220, and the storage media of the remote device 220 and computing system 200. In particular, the communication module enables the modules to access and process contact information that is stored in one or more contact information directories that may be stored locally and remotely. The communication module 260 may also comprise suitable computer executable instructions for communicating with various applications to determine what contact-centric objects are displayed and in what manner contact-centric objects are displayed on the user interface of the invention, as described below in reference to FIGS. 4-6.

The present embodiment also illustrates three contact information directories, 280*a*, 280*b*, and 280*c* that correspond to different applications/stores/directories from which the desired contact information may be obtained. For example, directory 280*a* may correspond to an email application and directory 280*b* may correspond to a telephony application. It will be appreciated, however, that the invention is not limited to use with any particular number of contact information directories or applications to which they correspond.

Contact Card User Interface

Figure 3:
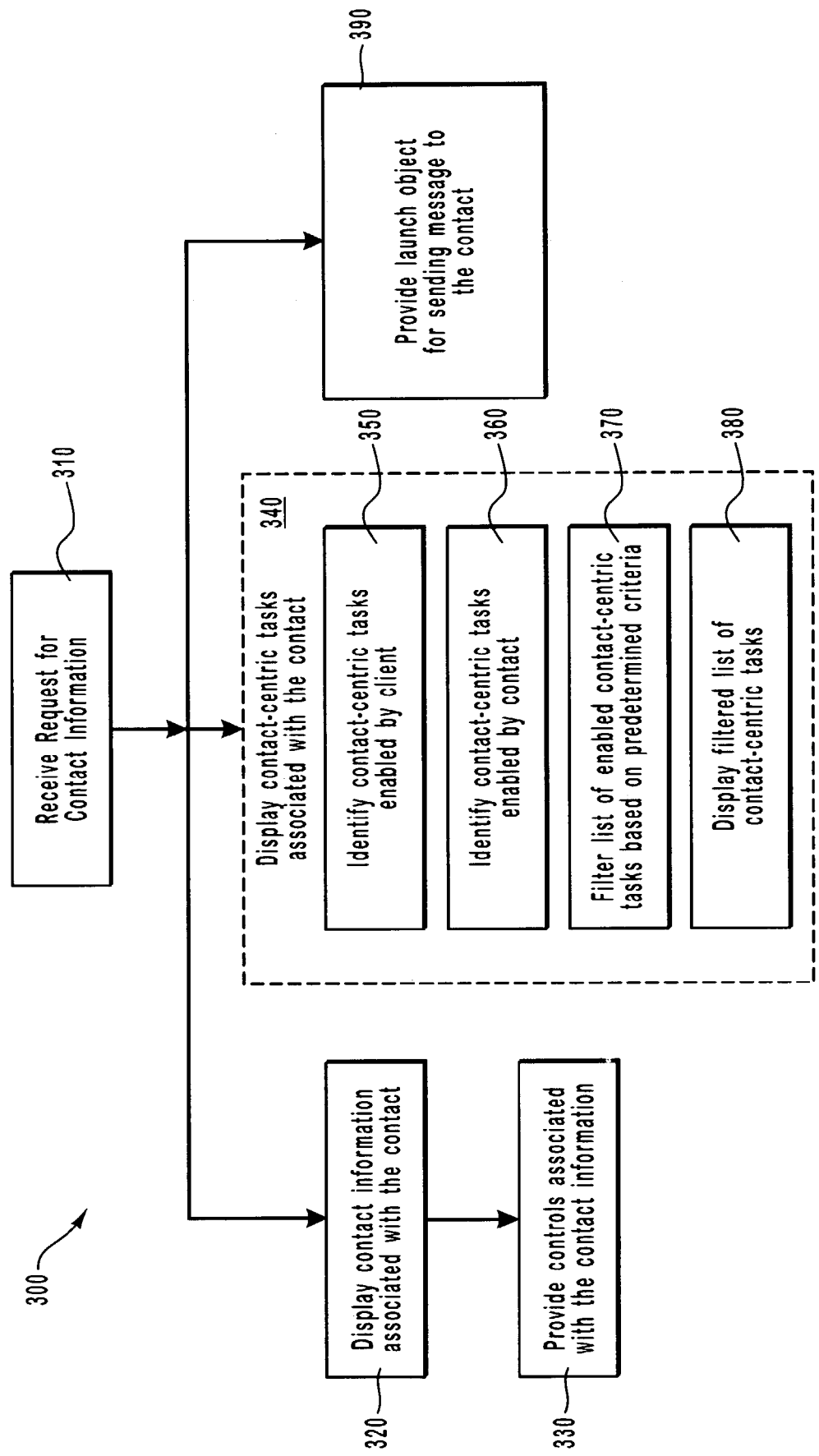
FIG. 3 is a flowchart illustrating certain acts of a method for displaying contact information according to the invention.
Figure 4:
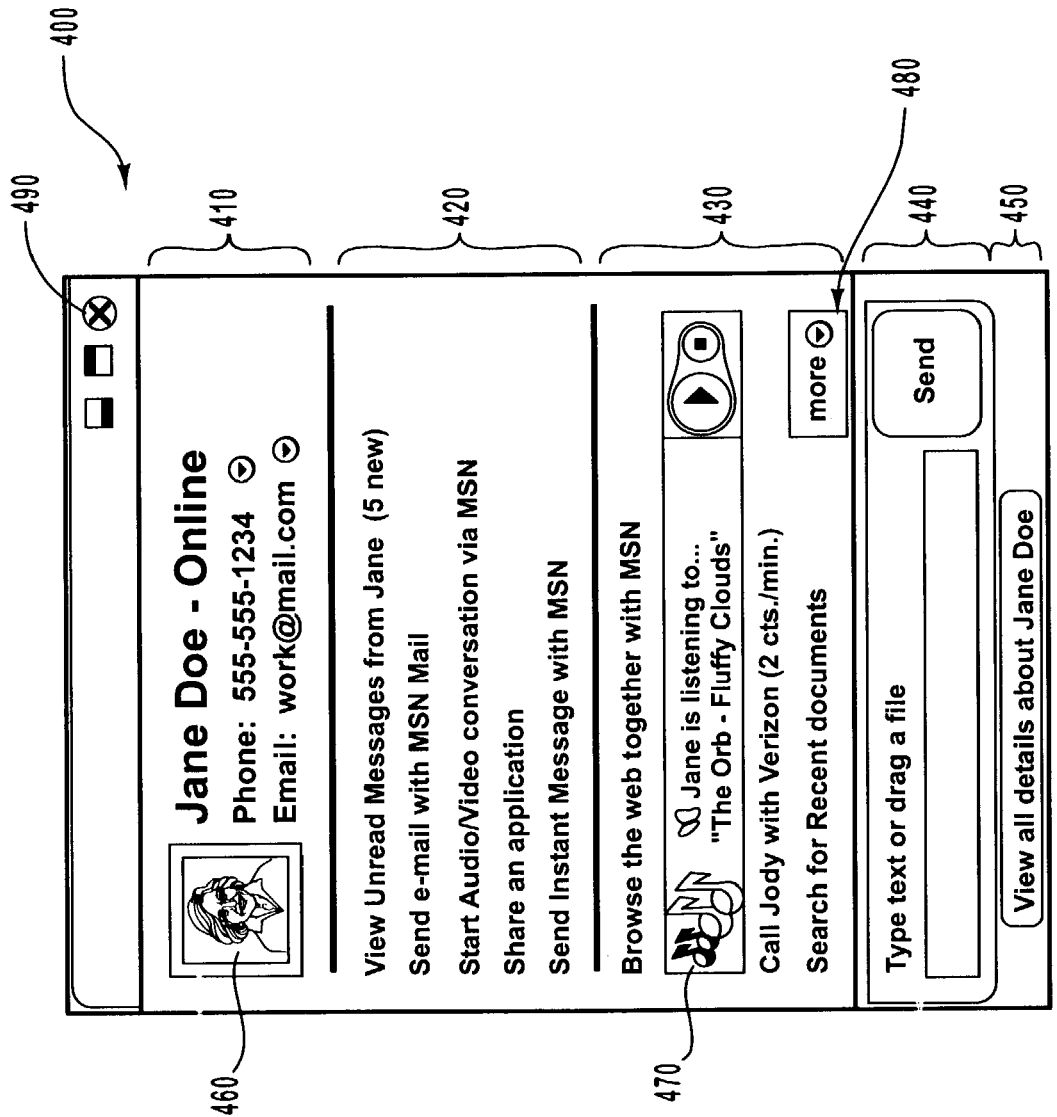
FIG. 4 illustrates one embodiment of a user interface for displaying contact information and contact-centric objects.
Figure 5:
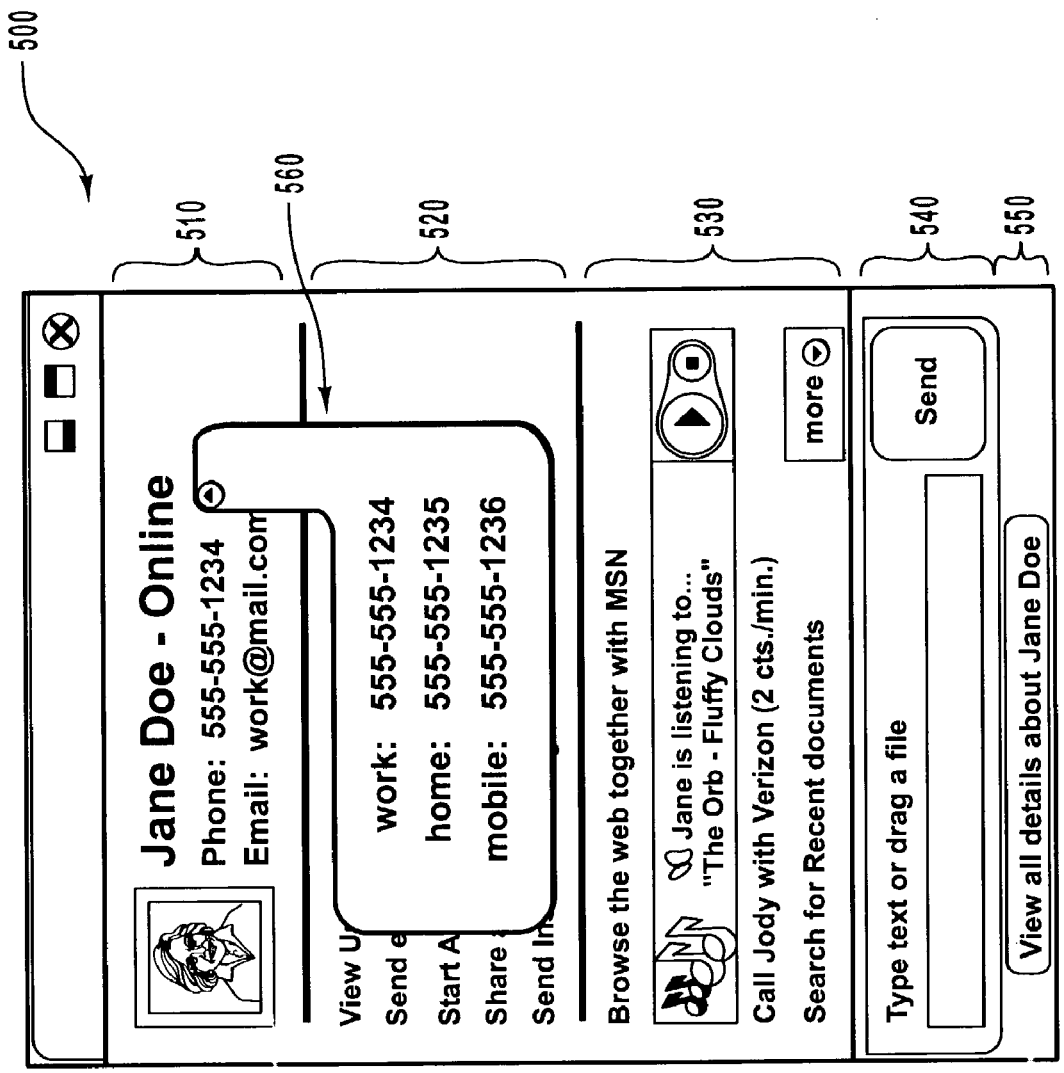
FIG. 5 illustrates one embodiment of a user interface for displaying contact information that shows a pull down menu for accessing additional contact information.
Figure 6:
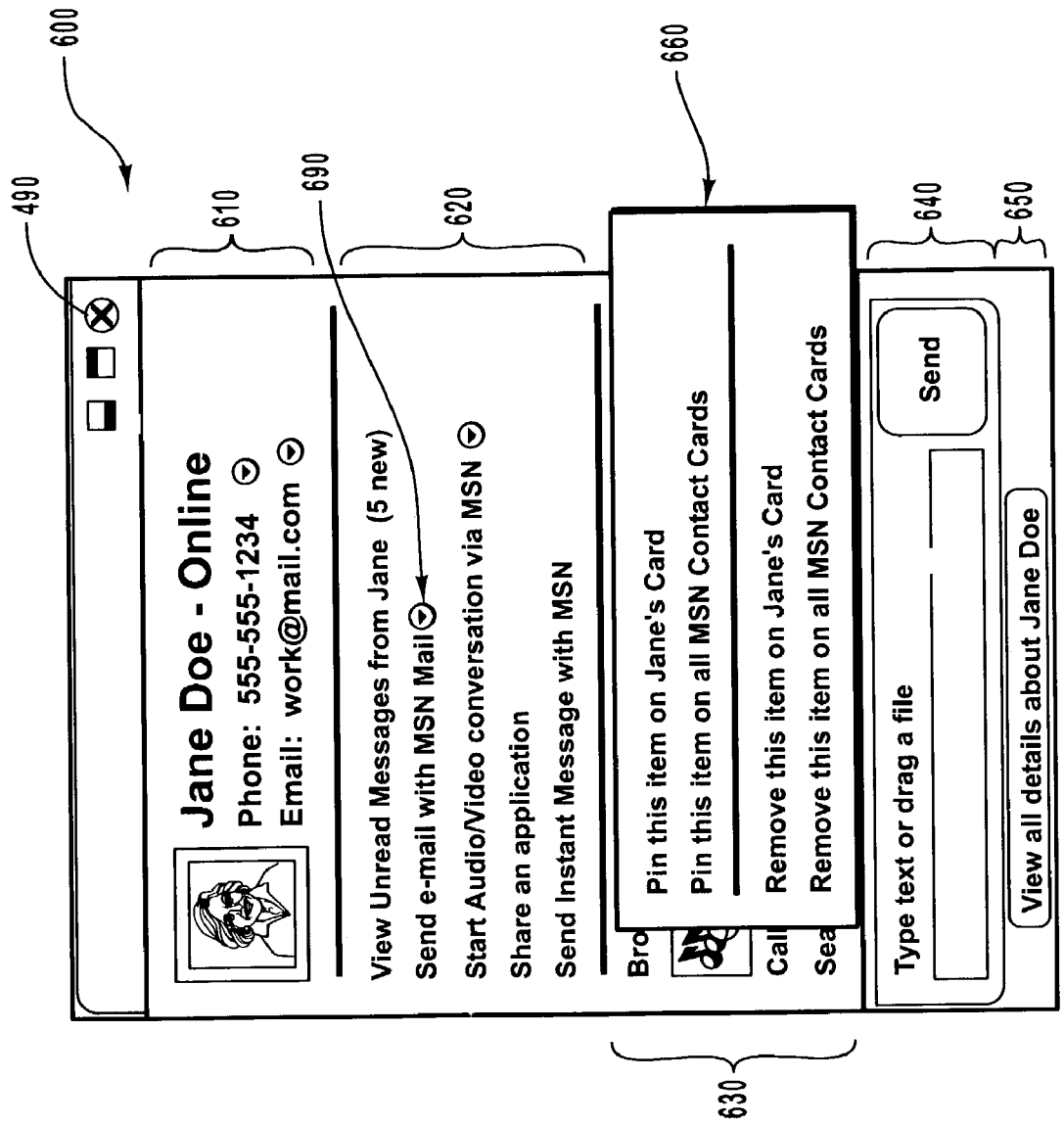
FIG. 6 illustrates one embodiment of a user interface for displaying contact information and contact-centric objects that also shows a menu for controlling the display of a contact-centric objects on the user interface.

FIG. 3 illustrates a flowchart 300 of one method for displaying contact information and contact-centric tasks at a display device from at least one contact information directory. According to the present embodiment, the method includes an act of receiving a request for a contact card (act 310), an act of displaying contact information associated with the contact card (act 320), an act of providing controls associated with the contact information (act 330), a step for displaying contact-centric tasks that correspond with the contact (step 340), and an act of providing a launch object that is capable of sending messages to the contact (act 390). These acts (acts 310, 320, 330, 390) and step (step 340) will now be described in more detail, with specific reference to the user interfaces 400, 500 and 600 that are shown in FIGS. 4-6.

Initially, the act of receiving a request for a contact card (act 310) may include an act of selecting an object or image from a menu or user interface. For example, a suitable request for the contact card may be given by using a mouse prompt to hover over or click on an image or symbol that is associated with a contact. The request for the contact card may occur from any interface or application hosting the light-weight contact card interface.

A suitable request may also include a function call for the contact card from one or more APIs associated with one or more different applications. For example, if a telephone call is received by the computing system, the telephone call receipt may trigger a function call for the contact card to display information associated with the contact making the telephone call.

Upon receiving a suitable request for the contact card, the computing system displays the contact card user interface at the display device 210 of the computing system 200. As illustrated by FIG. 3, this includes displaying contact information that is associated with the contact (act 320). The contact information that is displayed, according to act 320, may include a name, a telephone number, a fax number, an address, an email address, an image, job title, online presence, and/or any other information that may be associated with a contact.

According to one embodiment, the contact card is displayed as a lightweight user interface that appears as a fly out or balloon from a contact control (e.g., menu selection, icon, etc.), wherever it is embedded. The contact card interface can fly or balloon out of the contact control for enabling interaction by a user and then fly back when the interaction is complete. This example, however, is merely illustrative and should not, therefore, be interpreted as limiting the scope of the invention. Rather, this example is provided to illustrate how the contact card interface can be utilized with third-party applications or other hosting applications without undesirably disrupting the functionality and utility of the hosting applications.

FIG. 4 illustrates one embodiment of a contact card user interface 400 that is displaying contact information 410 according to the invention. In this embodiment, the contact information includes, a name (Jane Doe), a telephone number, an email address, an online presence status (Online/Offline), and an image that is associated with the contact (Jane Doe). This contact card 400. may be displayed, for example, when the name, image, or object associated with Jane Doe is selected from a menu, from a desktop interface, or from any other interface. Jane Doe's contact card 400, may also be displayed when a telephone call, an email, a fax, an instant message, or any other communication is received from Jane Doe.

It will be appreciated that the computing system may store numerous contact cards for various contacts, each contact card having unique contact information corresponding with the contacts. The contact card data and contact information can be stored in the storage medium 270, for example. Accordingly, the contact information 410 that is displayed on the contact card may be retrieved from storage medium 270. The invention also extends to embodiments in which the contact information is retrieved from any number of local and remote stores associated with any number of computer applications.

The present example shows that the contact card interface 400 may display the name, telephone number, network status, and email address of a contact. It will be appreciated, however, that this example does not limit the scope of the invention. Rather, the contact card interface does not necessarily have to display each of the illustrated elements of contact information 410, nor is the contact card interface limited to displaying only the illustrated elements of contact information 410.

According to one embodiment, the contact information 410 that is displayed is at least in part based on the schema that is used to classify and categorize the contact information. In particular, the schema module 250 enables the contact information to be prioritized so that certain primary contact information can be displayed while other contact information is hidden. This may be desirable, for example, when a large quantity of contact information is available, so as to avoid cluttering the user interface 400 with contact information that may not be needed every time the contact card is accessed. For example, when a large number of telephone numbers are associated with a contact, it may be desirable to prioritize the telephone numbers so that only the one or more frequently used telephone numbers are displayed.

If the contact card interface is configured to display contact information that is not currently available, then the contact card interface may display either blank fields or text where the contact information would otherwise be displayed, thereby indicating that the corresponding contact information is currently unavailable. For example, if a telephone number is presently unavailable, the term "Phone" may be followed by a blank or the text "unavailable." Likewise, if an image associated with the contact, such as a picture, is unavailable, then the image display portion 460 may be blank or display a generic image, indicating no image is currently available or associated with the contact.

The contact card interface may also display controls, objects, or menus for editing the contact information in-line. For example, if no phone number is available, the user may input the telephone number directly into the contact card by typing the telephone number into the field next to the text "Phone," which may be blank or filled with the text "unavailable" or other similar text. When contact information is edited, the edits to the contact information may be cached locally so that the edits can be reflected in the contact card the next time the contact card is accessed. Editing the contact information in this manner is referred to herein as in-line editing.

Contact information may also be edited in other ways. For example, if a user chooses to associate an image with a contact, the user may right click on the image and access a menu (not shown) that allows the user to link the image field 460 to an image selected by the user, such as through a browse function. The image can then be stored locally in storage medium 270 and displayed with the contact card the next time the contact card is requested.

According to yet another embodiment, the contact information can be automatically edited. For example, if certain contact information is unavailable in local storage, prompting the text "unavailable" to be displayed, the contact card interface can then query remote directories in remote storage media, such as through the Internet or other network connection, for the contact information. Once the contact information is found, the contact information is retrieved and automatically replaces the text "unavailable". Based upon the foregoing examples, it will be appreciated that the display of contact information by the contact card interface is dynamic and can be dynamically edited through manual in-line editing and automatically, as described above.

FIG. 5 illustrates another embodiment of the contact card interface 500. In this embodiment, the contact card interface 500 includes contact information 510 along with a pull down menu 560 that can be used to access contact information that is not displayed on the contact card interface 400 illustrated in FIG. 4. For example, if multiple phone numbers are associated with Jane Doe, some of which are not originally displayed with the contact card, then the pull down menu 560 can be used to view any of the phone numbers that have been associated with the contact, including the home, work and mobile numbers that have been associated with the contact.

The pull down menu 560 can be accessed using any standard practices for accessing a menu, such as, for example, clicking on an object linked to the menu. By way of example, the pull down arrow that is displayed next to the displayed telephone number may comprise one suitable object linking a pull-down menu. Other methods for accessing menu 560 may include, but are not limited to, hovering over and clicking on the displayed contact information (e.g., telephone number) with a mouse prompt.

A similar menu for editing the contact information may also be accessed using any of the standard practices mentioned above. Editing options may also be provided to enable a user to edit, drag, or move any of the phone numbers displayed in the pull down menu 560, to modify their content or order. It will be appreciated that the aforementioned acts of providing menus and objects for editing the contact information and for accessing undisplayed contact information correspond with the act of providing controls associated with contact information (act 330 of FIG. 3).

FIG. 3 also includes the step of displaying contact-centric tasks (step 340). This step may include any corresponding acts that are suitable for displaying contact-centric tasks. According to the present embodiment, step 340 includes the corresponding acts of identifying contact-centric tasks enabled by the client (act 350), identifying contact-centric tasks enabled by the contact (act 360), filtering a list of enabled contact-centric tasks based on a predetermined criteria (act 370), and displaying the filtered list of contact-centric tasks (act 380).

The act of identifying contact-centric tasks enabled by the client (act 350) is accomplished when the computing system 200 performs self-diagnosis or when another system determines what applications and activities may be engaged in with the contact by the computing system 200. For example, the computing system 200 may determine through self-diagnosis that it has adequate software and hardware for communicating with the contact via telephony, email, facsimile, instant messaging, and so forth.

The act of identifying contact-centric tasks that are enabled by the contact (act 360) is accomplished when the contact computing system (such as remote device 220) performs self-diagnosis or when another system, such as a server or computing system 200, determine what applications and activities may be engaged in between the computing system 200 and the contact. The computing system is then notified by the server or other computing system what, if any, contact-centric tasks the contact system is capable of performing.

The contact-centric tasks displayed by the contact card represent the activities that may be engaged in between the computing system 200 and the contact system. These contact-centric tasks may include such things as email activities, instant messaging activities, time scheduling activities, file transfer activities, telephony activities, audio/visual activities, facsimile activities, and so forth. Because the total number of available contact-centric tasks that are enabled may be more numerous than the contact card is configured to display, the contact card interface may filter the contact-centric tasks based on predetermined criteria. The contact-centric tasks may be filtered, for example, to display only the tasks that have been enabled by applications that have provided contact information to the computing system about the contact. This helps to prevent applications that are installed on the computing system from automatically populating the contact card interface with potentially undesirable listings of contact-centric tasks.

The contact-centric tasks may also be filtered by a contacts based on involvement or association with a group. For example, if a group has an instant messaging network established over the Internet, the contact card may filter the list of contact-centric tasks to omit the instant messaging capabilities of the group unless the contact is a member of the group.

The contact-centric tasks may also be filtered according to most frequent use or use within a predetermined period of time. For example, if a particular contact-centric task, such as sending facsimile, has not been utilized by the user of the computing system to engage or interact with the contact for a certain period of time, that contact-centric task may be omitted from the displayed list of contact-centric tasks.

FIGS. 4 and 5 illustrate one embodiment of contact card interfaces 400 and 500 displaying filtered lists of contact-centric tasks (act 380). As shown, contact-centric tasks are displayed in two sections, a pinned section 420 and 520, and a most frequently used section 430. and 530. For simplicity of discussion, reference will now be made with regard to the pinned section 420 and the most frequently used section 430 of FIG. 4.

In one embodiment, the pinned task section 420 has been separated from the most frequently used task section 430 to enable a user to separate contact-centric tasks that are preferred from all other contact-centric tasks. According to this embodiment, the pinned task section 420 only includes tasks placed in the pinned task section 420 by the user, or as assigned by the system designer. Any contact-centric tasks that are identified and enabled by subsequent software or hardware upgrades to the computing-system 200 are thereafter listed in the most frequently used task section 430, assuming they satisfy any predetermined criteria, as described above. Any newly available contact-centric tasks may be placed at the top of the most frequently used task section 430 or any other portion of the contact card interface 400.

According to one embodiment, the contact-centric tasks displayed in the most-frequently used section 430 are arranged in descending order of most frequent use. It will be appreciated, however, that the contact-centric tasks may be displayed in any desired arrangement and according to any desired predefined criteria, other than according to a most-frequent use.

The tasks that are displayed may be displayed as text links and/or as rich image links. One benefit of providing rich image links is to provide a quick visual association with a task that can be recognized by the user. Rich image links can also be useful, from one aspect, for enticing a user to select the link. When a user selects the displayed task, the task is launched. The tasks may be added to the list by the user, by applications installed by the user, or by a third party. It will be appreciated that any number of modules and APIs may be used to facilitate the addition of tasks to the contact card.

In certain embodiments, the displayed contact-centric tasks are owned by the application hosting the contact card. For example, if the contact card is opened from a Microsoft Word document, the Word document can control what tasks are displayed and can therefore display appropriate contact-centric tasks that correspond with the application (e.g., edit this document with this contact, schedule a meeting with this contact, and so forth).

If a user desires to alter the manner in which the contact-centric tasks are displayed, such as to move a contact-centric task from the most frequently used task section 430 to the pinned task section 420, the user may utilize a menu as illustrated in FIG. 6.

FIG. 6 illustrates a contact card interface 600, similar to those described above. However, in this embodiment, the contact card interface 600 includes an interface menu 660 for modifying the display of the contact-centric tasks. According to this embodiment, the interface menu 660 includes options for pinning or moving a contact-centric task from the most frequently used task section 630 to the pinned task section 620.

The menu 660 also includes an option for pinning the selected contact-centric task to a group of contact cards (e.g., all MSN contacts cards). Options for removing contact-centric tasks are also provided. In one embodiment, an option to remove a contact-centric task moves the contact-centric task to the bottom of an overflow section, which is accessed via the more button 480 (shown in FIG. 4). The overflow section (not shown) that is accessed by the more button 480, includes a listing of contact-centric tasks that are not displayed in the pinned and most frequently used task sections 420 and 430 of the contact card 400. It will be appreciated, that the menu 660 of FIG. 6 may be used to move or pin the contact-centric tasks listed in the overflow section. It should also be appreciated that the menu 660 may be configured with other options for altering the display of the filtered contact-centric tasks, in addition to those described above, such as, but not limited to, modifying the text of the displayed task, modifying the font size and color of the displayed task, and so forth.

According to one embodiment, there may be various applications that are capable of performing the same contact-centric tasks at the computing system 200. For example, the computing system 200 and the contact computing system may each have email capabilities for sending email through various email applications and/or servers (e.g., MSN email, Outlook, Eudora Pro, etc). The number of available contact-centric tasks and the manner in which they are displayed may be modified to accommodate various needs and preferences. According to one embodiment, however, only a single contact-centric task is displayed for each group of applications that can perform the task. By selecting the displayed contact-centric task, a preferred application is used to perform the task. For example, if Microsoft's MSN is the preferred email application, the selection of an email contact-centric task would cause the task to be performed with Microsoft's MSN.

According to another embodiment, any applications that can perform the same contact-centric task are grouped together into a pull-down menu that can be accessed through the contact card interface. For example, the task send e-mail with MSN Mail, which is shown in the pinned task section 620 of FIG. 6, may include a pull-down menu object 690, as shown, that can be selected to view the alternative applications for sending email (e.g., Outlook, Eudora Pro, etc.).

Pull-down menus and overflow menus can also be utilized to access a listing of other contact information and contact-centric tasks that are not displayed. For example, the more button 480 of FIG. 4 may be used to view additional contact-centric tasks that are not presently displayed. Likewise, objects such as the details button 450 may be used to view additional contact information about the contact that is not presently displayed. The details button 450 is yet another control object that can be provided by the contact card 400 to access the contact information that is associated with the contact (act 330).

As illustrated in FIGS. 4-6, the contact card interfaces 400, 500 and 600 also include a launch object 440, 540, and 640 respectively, that can be used to send messages to the contact. This launch object 440, 540 and 640 may be used to receive messages or attachments that can be sent to the contact. For example, a user can type text or drag a file into the type-in line of the launch object 440, 540 and 640, thereby causing the typed text or file to be sent to the contact via email, instant messaging, facsimile or with any other application. According to one embodiment, the launch object 440, 540 and 640 utilizes one or more of the contact-centric tasks listed in the pinned task section 420, 520 and 620. It will be appreciated, however, that contact-centric tasks listed in the most frequently used task section 430, 530 and 630 and in the overflow task section may also be used.

The contact card interface of the invention also supports rich mark-up formats for displaying the contact-centric tasks. For example, in FIG. 4, the listen to music with the contact task 470 is displayed in a rich mark-up format. The size and display constraints of the contact-centric tasks can be modified to accommodate various needs and preferences.

When a contact-centric task that is listed by the contact card is selected by a user, such as with a mouse prompt selection, then the application associated with the contact-centric task is launched. For example, the send e-mail with MSN Mail task, when selected, will launch the MSN mail application. The MSN mail application and other applications are launched by the contact card initiating a function call through the modules of the invention, such as the communication module 260 and the user interface module 230, or through an appropriate API. APIs and their operation are well known in the art.

In summary, the present invention provides methods, systems, and computer program products for obtaining and displaying contact information and contact-centric tasks that are associated with a contact via a contact card user interface. The contact card user interface displays the contact-centric tasks in a filtered and organized manner and allows the user to edit the manner in which the contact information and the contact-centric tasks are displayed. The manner in which the contact information and contact-centric tasks are displayed help to overcome some of the problems associated with other contact management systems and interfaces.

It will be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for displaying contact information and contact-centric tasks at a display device, the method comprising:
   receiving a request for a contact card;
   determining contact-centric tasks enabled by an application associated with a computing device of the client, wherein the computing device of the client performs a self-diagnosis to determine communication elements of the computing device of the client;
   determining contact-centric tasks enable by an application associated with a computing device of the contact, wherein determining contact-centric tasks enabled by the application associated with the computing device of the contact includes receiving a notification of performance capabilities of the computing device associated with the contact;
   determining a current online internet connection status of the computing device of the contact of the contact card;
   filtering the contact-centric tasks to include contact-centric tasks that are enabled by both the application associated with the computing device of the contact, the application associated with the computing device of the client, and the current online status of the communication device of the contact of the contact card; and
   displaying the contact card including:
      a contact information display portion located at an upper portion of the contact card, wherein the contact information display portion includes dynamically updatable contact information, wherein the dynamically updatable contact information includes a current on-line status of the contact;
      a pinned task display portion located below the contact information display portion, wherein the pinned task display portion includes manually assigned contact-centric tasks, wherein the pinned task display portion includes selectable objects associated with the assigned contact-centric tasks that launch an application that causes real time online communication between the computing device of the client and the computing device of the contact of the contact card;
      a frequently-used task display portion located below the pinned display portion, wherein the frequently-used task display portion includes contact-centric tasks that are frequently accessed, wherein the frequently-used task display portion are arranged in descending order of frequent use, wherein the frequently-used task display portion includes selectable objects associated with the frequently-used contact-centric tasks that launch an application that causes real time online communication between the computing device of the client and the computing device of the contact of the contact card; and
      a launch object display portion located at a lower portion of the contact card, wherein the launch object display portion includes a launch object for sending a message to the contact associated with the contact information, wherein the launch object display portion includes a contact detail expansion button for viewing additional details associated with the contact of the contact card.

2. A method as recited in claim 1, wherein third party applications control at least one contact-centric task.

3. A method as recited in claim 1, wherein the contact card is displayed as a fly out user interface.

4. A method as recited in claim 1, wherein the contact information is in-line editable.

5. A method as recited in claim 1, wherein the contact information includes at least one of: a name, an email address, an address, a telephone number, a facsimile number, and an image associated with a contact.

6. A method as recited in claim 1, wherein the contact information includes a name, an email address, and a telephone number.

7. A method as recited in claim 1, wherein the contact-centric tasks are owned and controlled by a hosting application.

8. A method as recited in claim 1, wherein the contact-centric tasks include at least one of: email tasks, file sharing tasks, audio/visual tasks, instant messaging tasks, and telephony tasks.

9. A method as recited in claim 1, wherein the contact-centric tasks include tasks added by a third party application.

10. A method as recited in claim 1, wherein the contact card user interface comprises a light-weight user interface that is hosted by a third-party application.

11. A method as recited in claim 1, wherein the contact card user interface is configured to not interfere with the third-party application.

12. A method as recited in claim 1, wherein the contact information is dynamically editable.

13. A method as recited in claim 1, wherein the contact information is dynamically editable by querying remote directories for updated contact information and displaying the updated contact information from the remote directories.

14. A computer-readable storage medium having computer executable instructions for displaying contact information and contact-centric tasks at a display device, the instructions comprising:
  receiving a request for a contact card;
  determining contact-centric tasks enabled by an application associated with a computing device of the client, wherein the computing device of the client performs a self-diagnosis to determine communication elements of the computing device of the client;
  determining contact-centric tasks enable by an application associated with a computing device of the contact, wherein determining contact-centric tasks enabled by the application associated with the computing device of the contact includes receiving a notification of performance capabilities of the computing device associated with the contact;
  determining a current online internet connection status of the computing device of the contact of the contact card;
  filtering the contact-centric tasks to include contact-centric tasks that are enabled by both the application associated with the computing device of the contact, the application associated with the computing device of the client, and the current online status of the communication device of the contact of the contact card; and
  displaying the contact card including:
    a contact information display portion located at an upper portion of the contact card, wherein the contact information display portion includes dynamically updatable contact information, wherein the dynamically updatable contact information includes a current on-line status of the contact;
    a pinned task display portion located below the contact information display portion, wherein the pinned task display portion includes manually assigned contact-centric tasks, wherein the pinned task display portion includes selectable objects associated with the assigned contact-centric tasks that launch an application that causes real time online communication between the computing device of the client and the computing device of the contact of the contact card;
    a frequently-used task display portion located below the pinned display portion, wherein the frequently-used task display portion includes contact-centric tasks that are frequently accessed, wherein the frequently-used task display portion are arranged in descending order of frequent use, wherein the frequently-used task display portion includes selectable objects associated with the frequently-used contact-centric tasks that launch an application that causes real time online communication between the computing device of the client and the computing device of the contact of the contact card; and
    a launch object display portion located at a lower portion of the contact card, wherein the launch object display portion includes a launch object for sending a message to the contact associated with the contact information, wherein the launch object display portion includes a contact detail expansion button for viewing additional details associated with the contact of the contact card.

15. A computer-readable storage medium as recited in claim 14, wherein third party applications control at least one contact-centric task.

16. A computer-readable storage medium as recited in claim 14, wherein the contact card is displayed as a fly out user interface.

17. A computer-readable storage medium as recited in claim 14, wherein the contact information is in-line editable.

18. A computer-readable storage medium as recited in claim 14, wherein the contact information includes at least one of: a name, an email address, an address, a telephone number, a facsimile number, and an image associated with a contact.

19. A computer-readable storage medium as recited in claim 14, wherein the contact information includes a name, an email address, and a telephone number.

20. A computer-readable storage medium as recited in claim 14, wherein the contact-centric tasks are owned and controlled by a hosting application.

21. A computer-readable storage medium as recited in claim 14, wherein the contact-centric tasks include at least one of: email tasks, file sharing tasks, audio/visual tasks, instant messaging tasks, and telephony tasks.

22. A computer-readable storage medium as recited in claim 14, wherein the contact-centric tasks include tasks added by a third party application.

23. A computer-readable storage medium as recited in claim 14, wherein the contact card user interface comprises a light-weight user interface that is hosted by a third-party application.

24. A computer-readable storage medium as recited in claim 14, wherein the contact card user interface is configured to not interfere with the third-party application.

25. A computer-readable storage medium as recited in claim 14, wherein the contact information is dynamically editable.

26. A computer-readable storage medium as recited in claim 14, wherein the contact information is dynamically editable by querying remote directories for updated contact information and displaying the updated contact information from the remote directories.

27. A system for displaying contact information and contact-centric tasks at a display device, the system comprising:
  a processor; and
  a memory having computer executable instructions stored thereon, the instructions comprising:
  receiving a request for a contact card;
  determining contact-centric tasks enabled by an application associated with a computing device of the client, wherein the computing device of the client performs a self-diagnosis to determine communication elements of the computing device of the client;
  determining contact-centric tasks enable by an application associated with a computing device of the contact, wherein determining contact-centric tasks enabled by the application associated with the computing device of the contact includes receiving a notification of performance capabilities of the computing device associated with the contact;
  determining a current online internet connection status of the computing device of the contact of the contact card;
  filtering the contact-centric tasks to include contact-centric tasks that are enabled by both the application associated with the computing device of the contact, the application associated with the computing device of the client, and the current online status of the communication device of the contact of the contact card; and
  displaying the contact card including:
    a contact information display portion located at an upper portion of the contact card, wherein the contact information display portion includes dynamically updatable contact information, wherein the dynamically updatable contact information includes a current on-line status of the contact;

a pinned task display portion located below the contact information display portion, wherein the pinned task display portion includes manually assigned contact-centric tasks, wherein the pinned task display portion includes selectable objects associated with the assigned contact-centric tasks that launch an application that causes real time online communication between the computing device of the client and the computing device of the contact of the contact card;

a frequently-used task display portion located below the pinned display portion, wherein the frequently-used task display portion includes contact-centric tasks that are frequently accessed, wherein the frequently-used task display portion are arranged in descending order of frequent use, wherein the frequently-used task display portion includes selectable objects associated with the frequently-used contact-centric tasks that launch an application that causes real time online communication between the computing device of the client and the computing device of the contact of the contact card; and a launch object display portion located at a lower portion of the contact card, wherein the launch object display portion includes a launch object for sending a message to the contact associated with the contact information, wherein the launch object display portion includes a contact detail expansion button for viewing additional details associated with the contact of the contact card.

28. A system as recited in claim 27, wherein third party applications control at least one contact-centric task.

29. A system as recited in claim 27, wherein the contact card is displayed as a fly out user interface.

30. A system as recited in claim 27, wherein the contact information is in-line editable.

31. A system as recited in claim 27, wherein the contact information includes at least one of: a name, an email address, an address, a telephone number, a facsimile number, and an image associated with a contact.

32. A system as recited in claim 27, wherein the contact information includes a name, an email address, and a telephone number.

33. A computer-readable storage medium as recited in claim 27, wherein the contact-centric tasks are owned and controlled by a hosting application.

34. A system as recited in claim 27, wherein the contact-centric tasks include at least one of: email tasks, file sharing tasks, audio/visual tasks, instant messaging tasks, and telephony tasks.

35. A system as recited in claim 14, wherein the contact-centric tasks include tasks added by a third party application.

36. A system as recited in claim 27, wherein the contact card user interface comprises a light-weight user interface that is hosted by a third-party application.

37. A system as recited in claim 27, wherein the contact card user interface is configured to not interfere with the third-party application.

38. A system as recited in claim 27, wherein the contact information is dynamically editable.

39. A system as recited in claim 27, wherein the contact information is dynamically editable by querying remote directories for updated contact information and displaying the updated contact information from the remote directories.

* * * * *